US008771084B2

(12) United States Patent   (10) Patent No.: US 8,771,084 B2
Gawel   (45) Date of Patent: Jul. 8, 2014

(54) GAMING AND/OR ENTERTAINMENT DEVICE

(75) Inventor: Marek Gawel, Traiskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 829 days.

(21) Appl. No.: 12/833,837

(22) Filed: Jul. 9, 2010

(65) Prior Publication Data

US 2010/0298056 A1    Nov. 25, 2010

Related U.S. Application Data

(63) Continuation of application No. PCT/EP2009/000358, filed on Jan. 21, 2009.

(51) Int. Cl.
  *A63F 13/00* (2014.01)
  *G07F 17/32* (2006.01)

(52) U.S. Cl.
  CPC ........ *G07F 17/3223* (2013.01); *G07F 17/3216* (2013.01)
  USPC .............................................. 463/46; 463/36

(58) Field of Classification Search
  USPC .............................................. 463/37, 30, 46
  See application file for complete search history.

(56) References Cited

U.S. PATENT DOCUMENTS

| | | | |
|---|---|---|---|
| 4,614,342 A | 9/1986 | Takashima | |
| 6,633,276 B1 | 10/2003 | Jaynes | |
| 8,133,118 B2* | 3/2012 | Borissov | 463/35 |
| 2002/0090988 A1 | 7/2002 | Frost et al. | |
| 2003/0131265 A1* | 7/2003 | Bhakta | 713/202 |
| 2004/0023709 A1 | 2/2004 | Beaulieu et al. | |
| 2006/0183544 A1* | 8/2006 | Okada | 463/31 |
| 2006/0189392 A1* | 8/2006 | Okada | 463/46 |
| 2006/0287103 A1 | 12/2006 | Crawford, III et al. | |

(Continued)

FOREIGN PATENT DOCUMENTS

| | | |
|---|---|---|
| DE | 3533443 | 6/1986 |
| DE | 102005063078 | 7/2009 |

(Continued)

OTHER PUBLICATIONS

International Patent Application No. PCT/EP/2009/000358 filed Jan. 21, 2009 in the name of Novomatic AG, International Search Report and Written Opinion mailed May 25, 2009.

*Primary Examiner* — Arthur O Hall
*Assistant Examiner* — Jeffrey Wong
(74) *Attorney, Agent, or Firm* — Levine Bagade Han LLP

(57) ABSTRACT

The present invention relates generally to a gaming and/or entertainment device having at least one screen which is adjustably arranged at a device panel. In this respect, the invention in particular relates to a multigame table having a plurality of player positions at which one respective screen is arranged at a table panel and/or desk panel. In accordance with the invention, the at least one screen is adjustable between a lowered position lowered into the device panel substantially without projecting over the device panel and an operating position protruding out of the device panel. The lowered position can in particular serve as an idle position in which the respective screen is so-to-say not in the way and a substantially planar device surface, in particular a table surface, can be provided. In the named lowered position, the screen can optionally be lowered beneath the device panel and the corresponding cut-out can be closed by a cover. Preferably, however, the screen in the named lowered position is lowered substantially flush with the panel surface.

3 Claims, 4 Drawing Sheets

(56) References Cited

U.S. PATENT DOCUMENTS

| | | | |
|---|---|---|---|
| 2007/0060360 A1 | 3/2007 | Walker et al. | |
| 2007/0111776 A1 | 5/2007 | Griswold et al. | |
| 2007/0173331 A1* | 7/2007 | Crawford et al. | 463/42 |
| 2009/0264194 A1* | 10/2009 | Kompella | 463/31 |

FOREIGN PATENT DOCUMENTS

| | | |
|---|---|---|
| EP | 0544155 | 12/1996 |
| EP | 1533763 | 5/2005 |
| EP | 1686549 | 8/2006 |
| EP | 1722560 | 11/2006 |
| JP | 2005328898 | 12/2005 |
| JP | 2007202792 | 8/2007 |
| WO | WO 95/030944 | 11/1995 |
| WO | WO 98/16144 | 4/1998 |
| WO | WO 2007/121577 | 11/2007 |

* cited by examiner

GAMING AND/OR ENTERTAINMENT DEVICE

CROSS-REFERENCE TO RELATED APPLICATIONS

This application is a continuation of PCT Application No. PCT/EP2009/000358, filed Jan. 21, 2009, which claims priority to German Patent Application No. 20 2008 000 841.7, filed Jan. 21, 2008, both of which are herein incorporated by reference in their entireties.

BACKGROUND (1) Field of the Invention

The present invention relates generally to a gaming and/or entertainment device having at least one screen which is adjustably arranged at a device panel. In this respect, the invention in particular relates to a multigame table having a plurality of player positions at which one respective screen is arranged at a table panel and/or desk panel.

(2) Description of the Related Art

With so-called multigame tables, which are, for example, used for playing poker, optionally also for playing roulette, it is known to provide screens at the respective player positions which are arranged on the gaming table section belonging to a player position. Such screens show corresponding game information to the respective player. Said information can, for example on a poker table, be the playing cards dealt to a player. Alternatively, for example on a roulette table, a wager field can be displayed on the screen on which, for example, when the screen is made in the form of a touch screen apparatus, the respective player can place his bets.

In this respect, it has already been proposed to support the screens arranged on the playing table adjustably so that each player can set his screen position individually, for example to reduce reflections on the screen, but also so as not to allow neighboring players to see his own screen. The named screens can in particular be tilted about horizontal transverse axes to set them upright, so-to-say, with respect to the player sitting at the playing table. This, however, sometimes impairs the clarity of the playing table.

SUMMARY OF THE INVENTION

Starting from this, it is the underlying object of the present invention to provide an improved gaming and/or entertainment device of the named kind which avoids disadvantages of the prior art and further develops it in an advantageous manner. A screen positioning should in particular be achieved which can be better adapted to the respective group of players at the device, which offers high operating comfort and which can be adapted to the course of the game.

This object is solved in accordance with the invention by a gaming and/or entertainment device in accordance with claim 1. Preferred embodiments of the invention are the subject of the dependent claims.

An arrangement of the screens is therefore provided which can be lowered into the device panel so that screens which are not needed or screens of a player no longer entitled to play can be moved away, whereby, on the one hand, the clarity of the gaming device is improved overall and, on the other hand, a display is also created as to whether a respective player position is in operation or not. In accordance with the invention, the at least one screen is adjustable between a lowered position lowered into the device panel substantially without projecting over the device panel and an operating position protruding out of the device panel. The lowered position can in particular serve as an idle position in which the respective screen is so-to-say not in the way and a substantially planar device surface, in particular a table surface, can be provided. In the named lowered position, the screen can optionally be lowered beneath the device panel and the corresponding cutout can be closed by a cover. Preferably, however, the screen in the named lowered position is lowered substantially flush with the panel surface.

In this respect, the screen can generally be adjusted in different manners. It is in particular tiltable at least about a horizontal transverse axis so that it can, so-to-say, be tilted out of the named lowered position toward the player located in front of the device. Alternatively or additionally, the screen can also be pivoted about a preferably horizontal longitudinal axis and/or about an upright vertical axis, which can, for example, be used to tilt the screen away from a neighboring player so that he is not allowed to look at the screen. Alternatively or additionally, the named screen can furthermore also be adjustable in translation, in particular movable outward or inward substantially perpendicular to the device panel surface, whereby the screen can be moved out of or into the device panel, optionally also without tilting out of the device panel. To provide maximum adjustment possibilities, the screen can be adjustably supported multiaxially.

In a simple further development of the invention, provision could generally be made that the screen can be adjusted by hand. To achieve a high operating comfort and to enable an easy adjustability, optionally also of very large screens, however, in a further development of the invention, an actuator unit, is associated with the screen, preferably an electric motor, by means of which the screen can be adjusted by outside energy. The actuator unit is in this respect in particular at least associated with the movement axes of the screen which allow a vertical movement component so that at least the positional movements made more difficult by the weight of the screen can be carried out by a motor. However, the actuator unit can advantageously be made accordingly to work multiaxially to be able to actuate the different movement axes of the screen by a motor.

To enable a particularly simple operation of the playing device with high handling comfort, in accordance with a further aspect of the present invention, a preadjustment device is provided for the automatic presetting of the at least one screen to a predetermined screen position in dependence on a respective player detected by an identification device at the respective player position. The named presetting apparatus keeps different preset screen positions available for different players or different groups of players. As soon as the identification device identifies a player or a group of players for which a specific screen position is predetermined, the presetting apparatus moves the screen into this predetermined screen position.

The presetting apparatus in this respect advantageously includes a programmable memory function by means of which a player can set and store his favorite screen position to be able to recall it, so-to-say, on the next visit to the gaming or entertainment device. The presetting device can for this purpose have a position memory in which a respective individually set screen position is stored in conjunction with a player identification code. If the corresponding player identification code is supplied to the presetting apparatus, the stored screen position is recalled and set.

In order further to increase the operating comfort, the presetting device can provide an automatic storage of the respective last set screen position which the respective player had, so-to-day, last set on quitting the gaming device. A corresponding memory control stores the last set screen position in the previously named position memory if a respective player logs off, for example by ending the game.

The player identification can generally take place in different manners. For example, input means, for example a keyboard, actuable by the player can be provided via which an individual code can be input. In a preferred further development of the invention, the identification apparatus can have a chip card reading device. If, for example, a player inserts his credit card or a player I.D. into the device, the screen position stored for this purpose is recalled and moved to.

Alternatively or additionally, the identification device can have a biometric data reading device, for example in the form of a fingerprint reader and/or an eye scanner or iris reader.

The adjustability of the at least one screen can also be used in an advantageous further development of the invention to adjust the screen position automatically in dependence on the game procedure, whereby, on the one hand, an increase in the playing incentive is achieved and, on the other hand, a game control and a display of the game status can also be achieved. For this purpose, in a further development of the invention, a control apparatus can be provided for the automatic adjustment of the screen position in dependence on the game procedure. Special game sections or processes and special game situations can be emphasized by changing the screen position or by moving the screen so that the attention of the players is directed to the respective player position The game procedure control of the screen position can in this respect generally be made differently. Advantageously, winnings display means can be provided for the change in the screen position and/or for the cyclic movement to and fro of the screen on reaching a game win or on reaching a decisive game situation, for example, shortly before issuing the decisive playing card. If, for example, a poker player is given his last playing card, the control apparatus can move the actuator unit to and fro in a shaking manner and/or move it up and down and/or tilt it to and fro by a corresponding control of the actuator unit or of the plurality of actuator units of a screen. The screen position can also be changed on the occurrence of other game situations; for example, on the reaching of a win, the screen can be raised in order, so-to-say, symbolize a raised pedestal position of the player.

Deactivation means working on dependence on a still present game credit and/or on an available wager can in particular also be provided which, for example, on a complete use of the game credit, can move the screen into its lowered idle position and/or can bring the screen into its position protruding from the device panel on the topping up of the game credit.

Alternatively or additionally to the named automatic control of the screen position, the gaming and/or entertainment device can also have a manual control of the screen actuator unit. The input means provided for this purpose can in this respect generally have different characteristics. To promote the operability independently of the player position, provision can be made in a further development of the invention that the input means have a foot pedal and/or a knee pedal for the adjustment of the screen position. Alternatively or additionally, a hand button and/or a hand lever can also be provided, preferably in the form of a joystick, for the adjustment of the screen position. In this respect, the input means can be physically connected to the gaming device, can in particular be arranged at the device panel at which the screen is supported. Alternatively or additionally, inputs means in the form of a remote control, for example in the form of a separate foot pedal, can also be provided which communicate contactlessly with the gaming and/or entertainment device. In this respect, different transmission means can be used for the communication, for example an infrared interface and/or a Bluetooth interface.

The previously described screen adjustability is particularly advantageous in a gaming and/or entertainment device which has a playing table with a plurality of player positions which each have a screen adjustably supported at a player panel. Such playing tables can in particular be used as poker tables or also as roulette tables. In an advantageous further development of the invention, the playing table can have a modular design and be composed of a plurality of table panel components, with the named table panel components advantageously each having a panel part at which a respective screen is movably supported in the previously named manner and which has lateral connector pieces for the connection of table connection pieces and/or end pieces. A playing table can hereby be individually configured in a simple manner and can be made with different numbers of player positions.

BRIEF DESCRIPTION OF THE DRAWINGS

The invention will be explained in more detail in the following with respect to a preferred embodiment and to associated drawings. There are shown in the drawings.

DETAILED DESCRIPTION

Figure 1:
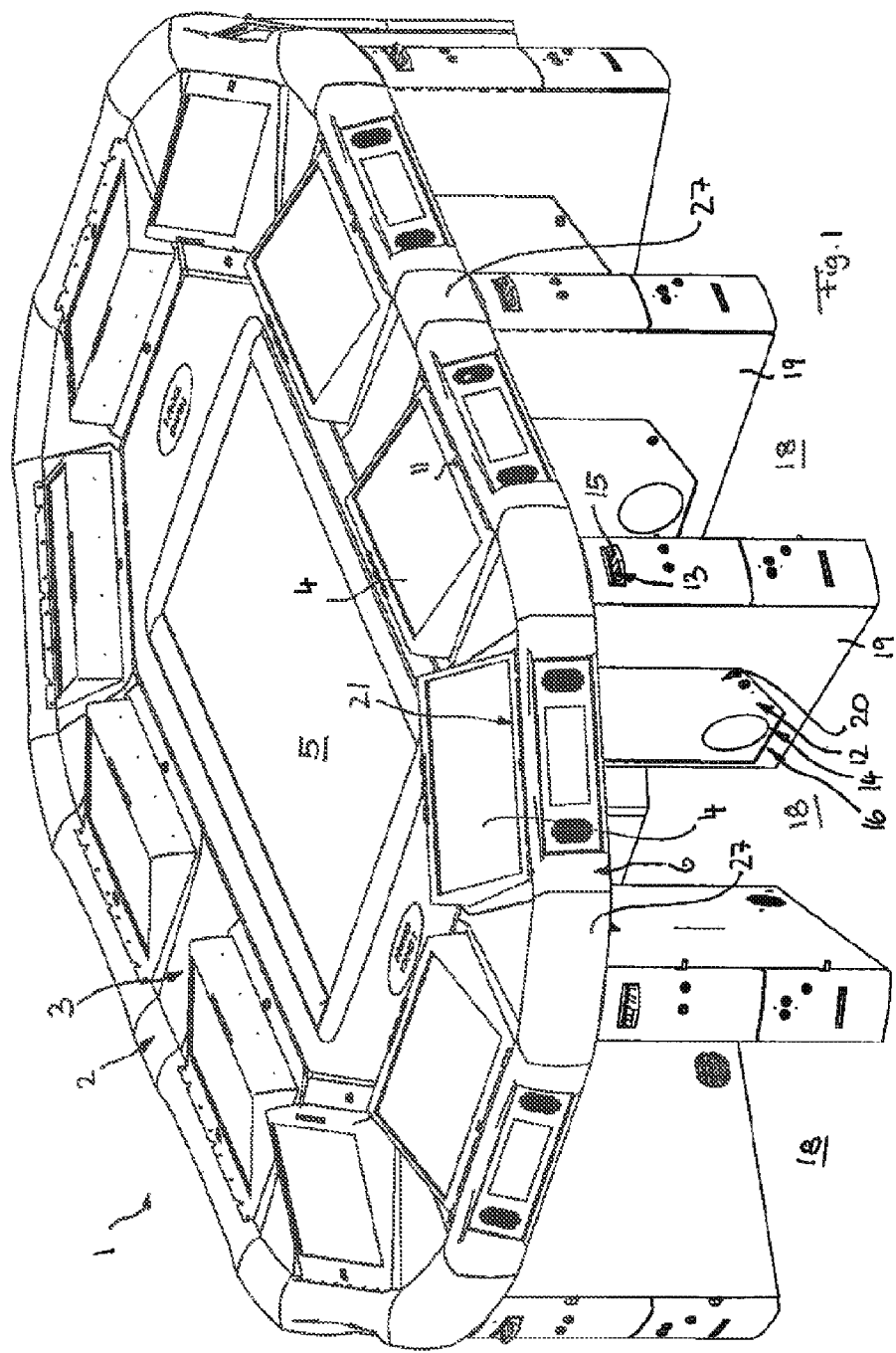
FIG. 1: a schematic, perspective total view of a gaming and/or entertainment device in the form of a multigame table having a plurality of player positions which each have a screen lowerable into a table panel.

The embodiment of a gaming and/or entertainment device 1 drawn in the Figures is made as a multigame table which has a playing table 2, with a plurality of player positions 18 being arranged in annular form around a central playing field 5. The table panel 3 surrounding the central playing field 5 in annular form has a screen 4 at each player position 18 which is adjustably supported at the respective panel part, as will still be explained. The table panel 3 is seated on playing table consoles 19 which are arranged in bar shape and into which a game control device 20 belonging to the respective player position 18 having corresponding control means and an output apparatus can be integrated. A respective money input and/or output device for the crediting of a player or a corresponding card reading device can be present at the playing table consoles 19, as is also known per se at such playing tables. The playing table consoles 19 so-to-say form the feet of the playing table 2.

Each player position 18 in front of each screen 4 has an operating panel 21 which can be integrated into the table panel 3, cf. FIG. 1.

Figure 3:
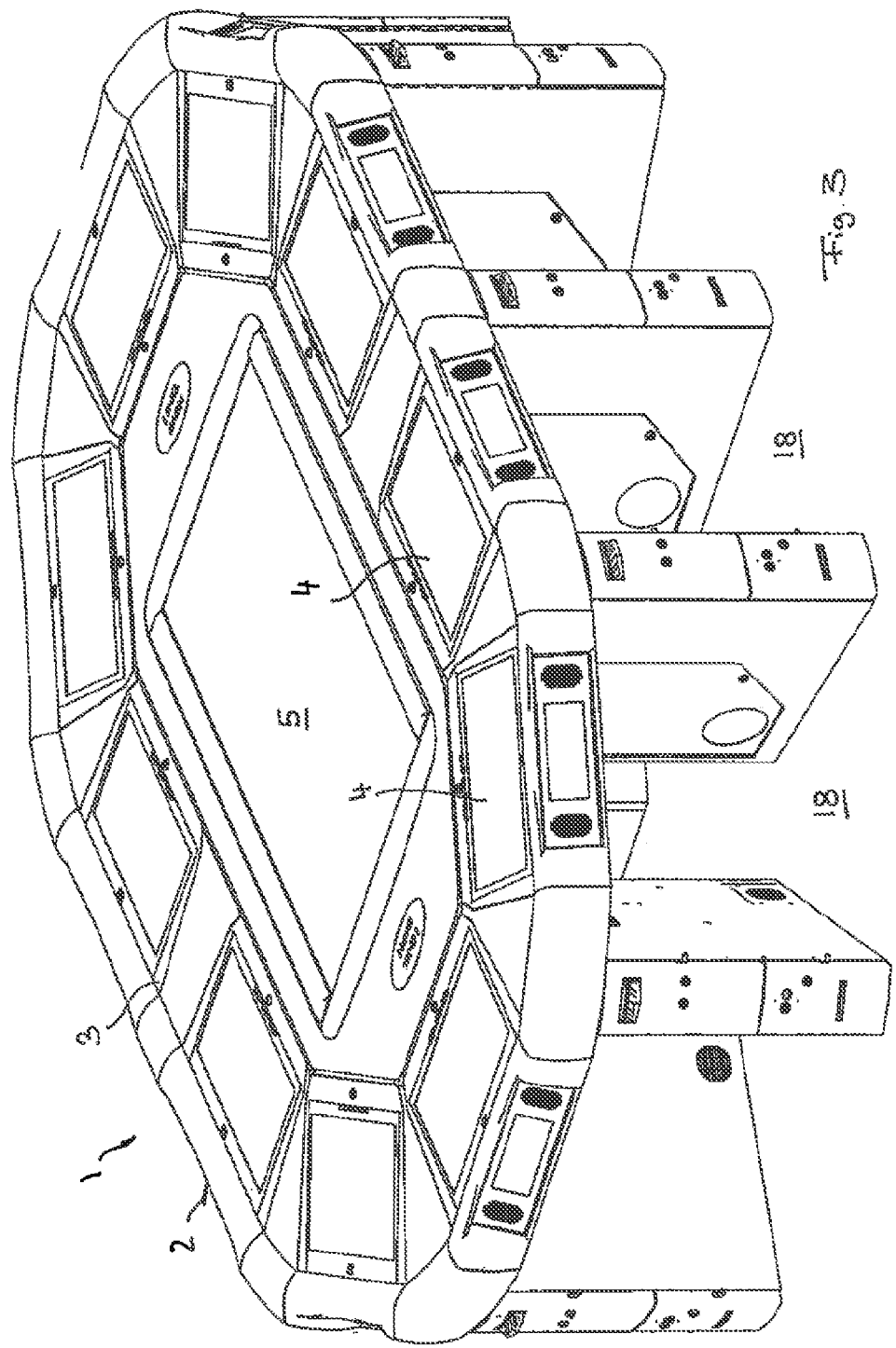
FIG. 3: a perspective total view of the multigame table of FIG. 1, with the screens being shown in their lowered positions lowered into the table panels.
Figure 4:
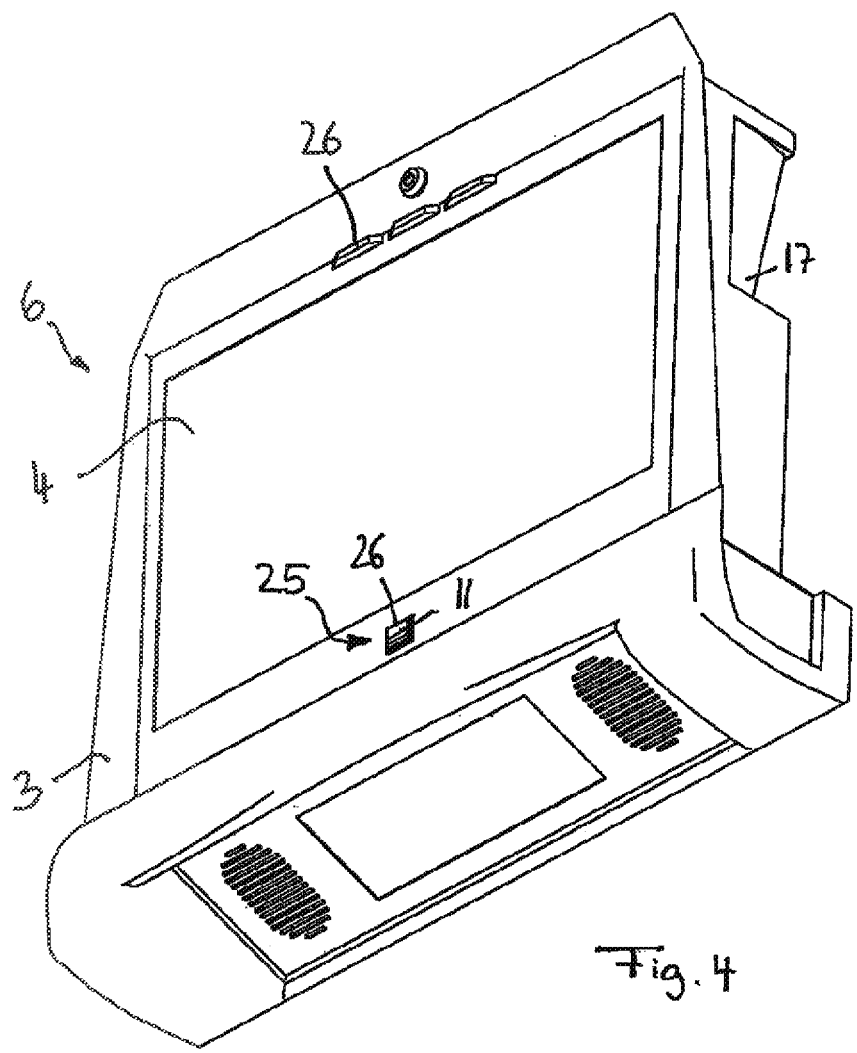
FIG. 4: a perspective view of an individual table panel component similar to FIG. 2, with the screen being shown in its position lowered into the panel part.

The screens 4 are adjustably supported at the table panel 3. As a comparison of FIGS. 1 and 3 shows, the screens 4 can in particular be pivoted about a horizontal transverse axis so that the screens 4 can be tilted so-to-say toward the respective player sitting or standing at the playing table 2. While FIG. 1 shows the tilted-up position, the lowered idling position of the screens 4 is shown in FIG. 3. The screens 4 can in this respect in particular be brought into a lowered position lowered into the table panel 3, in which lowered position the screens 4 are lowered into the table panel 3 essentially flush with the surface thereof.

In addition to the adjustability about the horizontal transverse axis 22, provision can optionally be made that the screens 4 can be tilted and/or pivoted about a horizontal longitudinal axis 23 and/or about a vertical axis 24. Alternatively or additionally, a movement of the screens 4 in translation along the vertical axis 24 can also be provided.

To adjust the screens 4, corresponding actuator units are associated with them which are advantageously integrated horizontally into the table panel 3 beneath the screens 4. The named actuator units can advantageously be electric motors which can optionally effect the desired screen movements about the respective movement axes via suitable deflection means or transmission means.

To actuate the actuator units, suitable input means 25, for example in the form of a hand button or of a hand lever 26 can be provided at the table panel 3 and/or at the respective screen 4 by whose actuation the respective actuator unit can be controlled.

The actuator units for the screen adjustment are additionally connected to the previously named control device 20 which advantageously has a control apparatus for the automatic control of the screen adjustment in dependence on the game procedure and/or on game situations which occur. The named control apparatus can in this respect, for example, include winning control means which tilts the screen 4 of a respective game winner up and down to indicate this or which moves the screen upwardly to make an otherwise hidden sign "Winner" visible. The named control apparatus can furthermore include activation means and/or deactivation means which work in dependence on a game credit still available to the respective player position. The deactivation means can in particular automatically move the screens 4 into the lowered position shown in FIG. 3 when the game credit has been used at the respective player position.

The control device 20 furthermore advantageously includes a presetting apparatus 12 which cooperates with an identification means 13 which in the embodiment shown includes a chip reading device 15 arranged at the playing table console 12, but can also, for example, include a fingerprint reading device arranged at the table panel 3. The named presetting device 12 in this respect sets a screen position predetermined for a respective player as soon as the identification device 13 has identified a player playing at the respective player position 18. This can, for example, take place in that the respective player inserts his player pass or his credit card into the chip card reading device 15. The named presetting apparatus 12 in this respect includes a position memory 14 in which the preferred screen position is stored for the respective player, and indeed together with an identification code which, on the input of this identification code, allows the associated screen position to be read out and moved to. In this respect, when a player removes his card from the chip card reading device 15 again and/or logs off from the device, the last set screen position is advantageously stored as a preferred screen position which is then automatically moved to the next time when the player again logs on at the table. In this respect, the screen position is advantageously stored centrally and/or stored by other control devices 20 in a recallable manner so that the screen of a different player position can also be set correspondingly when the player sits at the playing table 2 there the next time.

Figure 2:
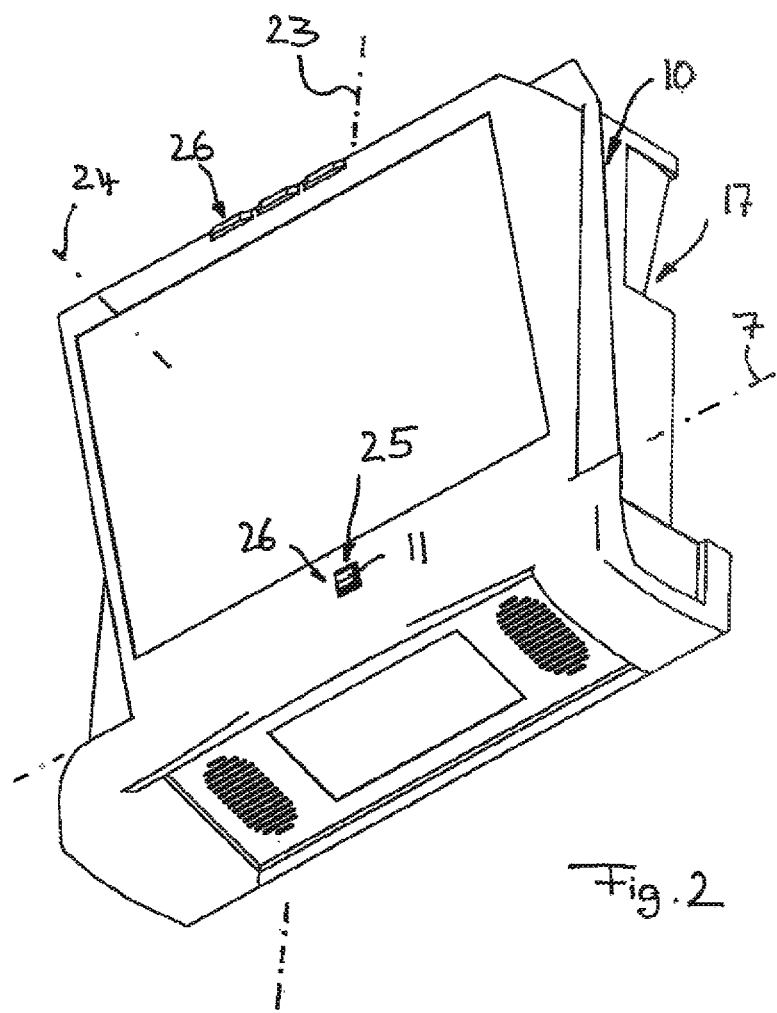
FIG. 2: a perspective view of an individual table panel component having a screen tilted out of the panel part.

As FIGS. 1 and 2 illustrate, the playing table 2 has a modular structure and is composed from a plurality of panel components 6. Such a panel component 6 has, as FIG. 2 shows, a respective screen 4 which can be lowered into and moved out of the respective panel component 6 in the described manner. At the side, the panel component 6 has connectors 17 by means of which the different panel components 6 can be set next to one another or can be put together with connector pieces 27 together with which the player table 2 can be made as a whole.

I claim:

1. A device for at least one of gaming and entertainment comprising:
a multiplayer table device comprising a first screen adjustably arranged at a device panel and a second screen, wherein the first screen is adjustable between a lowered position lowered into the device panel substantially without projecting over the device panel and an operating position protruding out of the device panel;
an identification device; and
a presetting apparatus, wherein the presetting apparatus is configured to automatically preset the first screen to a predetermined screen position dependent on a player detected by the identification device;
wherein a control apparatus is provided for the automatic adjustment of the first screen position in dependence on the game procedure, and wherein the control apparatus has a winning display element for at least one of the adjustment of the first screen position, and the cyclic moving forward and backward of the first screen on the achieving of a game win.

2. A device for at least one of gaming and entertainment comprising:
a multiplayer table device comprising a first screen adjustably arranged at a device panel and a second screen, wherein the first screen is adjustable between a lowered position lowered into the device panel substantially without projecting over the device panel and an operating position protruding out of the device panel;
an identification device; and
a presetting apparatus, wherein the presetting apparatus is configured to automatically preset the first screen to a predetermined screen position dependent on a player detected by the identification device;
wherein a control apparatus is provided for the automatic adjustment of the first screen position in dependence on the game procedure, and wherein the control apparatus has a winning display element for at least one of the adjustment of the first screen position, and the cyclic moving upward and downward of the first screen on the achieving of a game win.

3. A device for at least one of gaming and entertainment comprising:
a multiplayer table device comprising a first screen adjustably arranged at a device panel and a second screen, wherein the first screen is adjustable between a lowered position lowered into the device panel substantially without projecting over the device panel and an operating position protruding out of the device panel;
an identification device; and
a presetting apparatus, wherein the presetting apparatus is configured to automatically preset the first screen to a predetermined screen position dependent on a player detected by the identification device;
wherein a control apparatus is provided for the automatic adjustment of the first screen position in dependence on the game procedure, and wherein the control apparatus has a winning display element for at least one of the adjustment of the first screen position, and the cyclic moving outward and inward of the first screen on the achieving of a game win.

\* \* \* \* \*